March 6, 1945. H. GASTROW 2,370,622
MECHANICAL CLOSING DEVICES FOR INJECTION MOLDING MACHINES
Filed Feb. 24, 1939 3 Sheets-Sheet 1
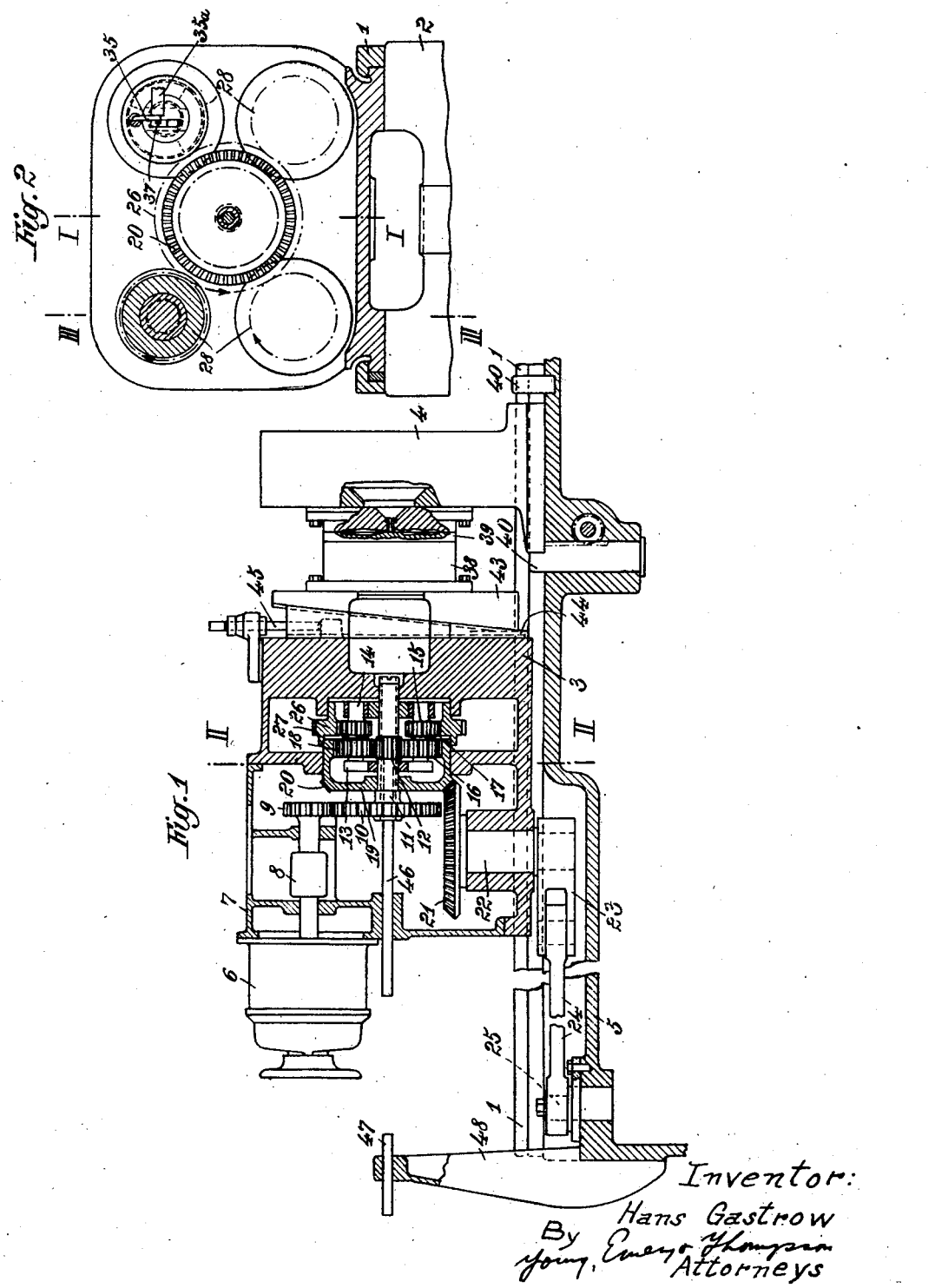
Inventor:
Hans Gastrow
By Young, Emery & Thompson
Attorneys

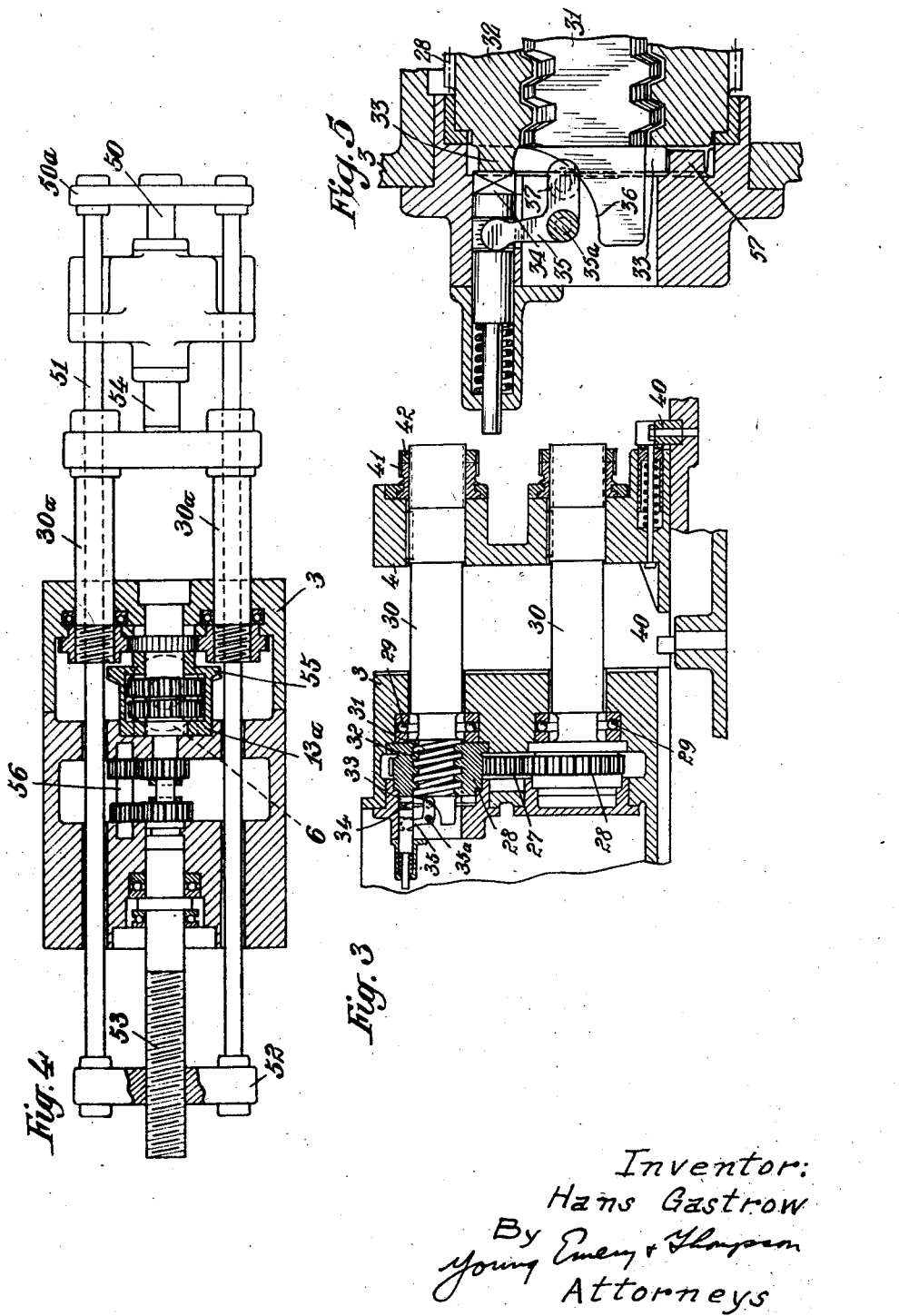

March 6, 1945. H. GASTROW 2,370,622
MECHANICAL CLOSING DEVICES FOR INJECTION MOLDING MACHINES
Filed Feb. 24, 1939 3 Sheets-Sheet 3
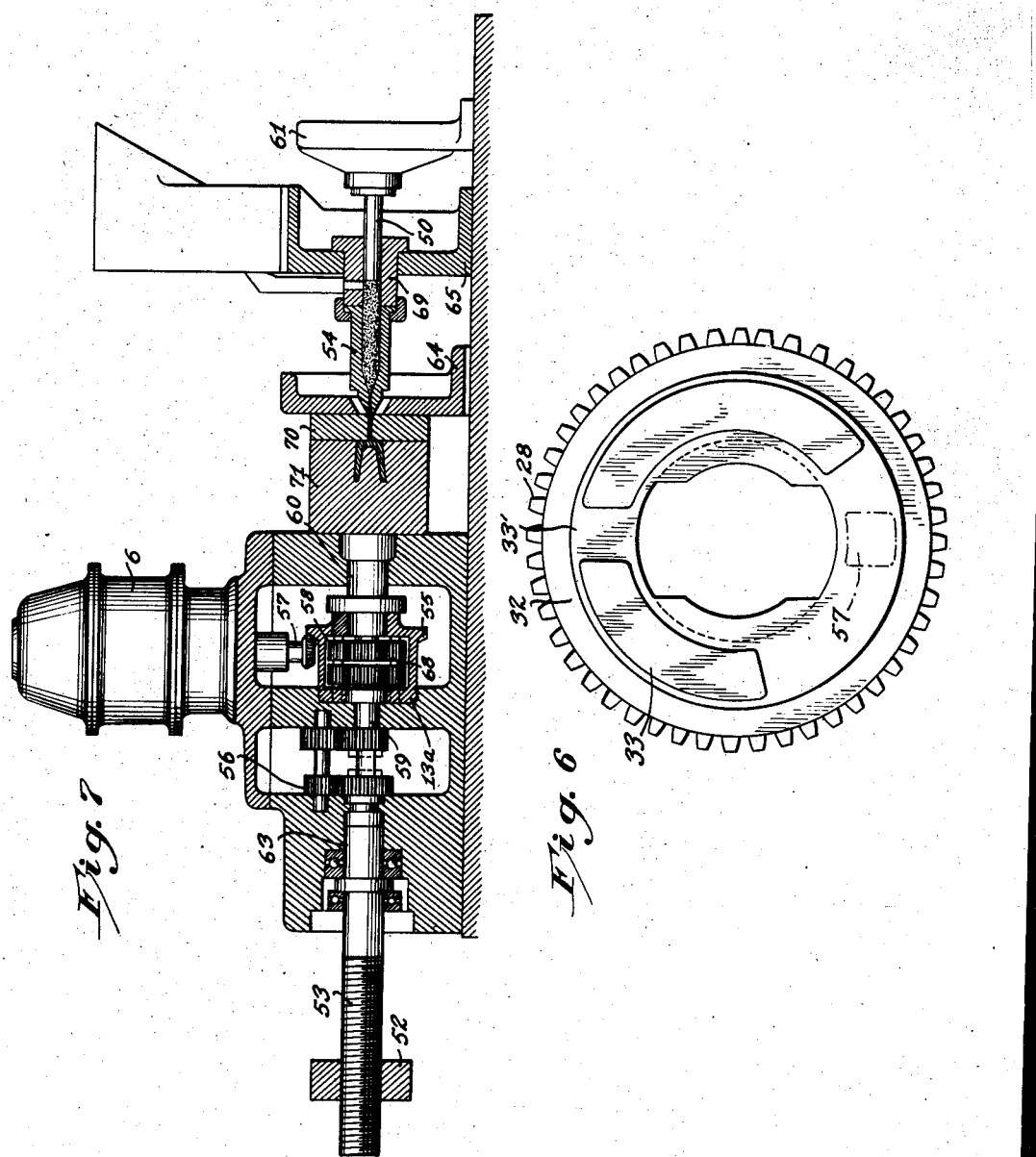
Inventor
HANS GASTROW
By Attorney.

Patented Mar. 6, 1945

2,370,622

UNITED STATES PATENT OFFICE 2,370,622

MECHANICAL CLOSING DEVICE FOR INJECTION MOLDING MACHINES

Hans Gastrow, Zerbst in Anhalt, Germany; vested in the Alien Property Custodian

Application February 24, 1939, Serial No. 258,329
In Germany March 11, 1938

6 Claims. (Cl. 18—30)

In injection metal or plastic masses, high pressures, which may amount particularly in the case of plastic masses to over 1,000 atmospheres, occur within the mold. By plastic masses is understood non-metallic plastics, such as, for example, synthetic resinous thermosetting materials and other non-metallic plastic thermosetting compositions. Consequently, when the injecting parts are of large superficial area, the mold, which generally is in two parts, is opened by forces which may amount to 100 tons or more. These forces must be taken up by the locking means, and the expansion of this locking means must be kept within very narrow limits.

A mold closing device has two carriers, one for each half of the mold. Normally these slide tables for the molds, so far as they are mechanically driven, are opened, closed and locked by eccentrics, toggle levers or double toggle levers. For the purpose of locking, the movable slide table of the mold is pressed against the fixed slide table of the mold by the toggle lever. The toggle lever bears against the frame of the injecting molding machine or against the rails or tie rods, which are connected with the fixed slide table of the mold or have an abutment for the latter respectively. Due to the great length of the hitherto usual locking means, the mold cannot be closed safely even by employing great locking forces, as in consequence of the great forces within the mold due to the injection procedure, the deformations of the locking pieces reach values which cause an undesirable separation of the halves of the mold from each other.

In accordance with the invention, the locking of the slide tables of the mold is effected by mechanically driven means in such a way that the locking forces which act against the forces for opening the mold are directly transmitted from one slide table of the mold to the other. This arrangement enables the locking means to be kept short, with the result that expansion of the locking means is reduced to a negligible amount.

Screw bolts and nuts are employed, in accordance with the present invention, as locking means, by means of which pressure is brought to bear upon both the slide tables of the mold. The drive engages the nuts. An electric driving motor is directly attached to the movable slide table of the mold, in accordance with the present invention. This motor serves both for closing and opening the closing device of the mold. The mounting of the motor upon one of the slide tables of the mold has the advantage that the necessary force for the locking members may be transmitted in the shortest way to the said nuts. Moreover a shortening in the length of the construction of the machine is thereby achieved.

The invention will now be described with reference to the accompanying drawings, showing by way of example one embodiment.

In the drawings:

Figure 1 is a section through the locking device of the mold on the line I—I of Figure 2, Figure 2 is a section on the line 2—2 of Figure 1, Figure 3 shows a horizontal section on the line 3—3 of Figure 2 and Figure 4 shows a further embodiment of the invention given as an example.

Fig. 5 is a cross sectional view on an enlarged scale of one of the cooperating nut and screw bolts of Fig. 3;

Fig. 6 is a front elevation of one of the nuts; and

Fig. 7 is a longitudinal sectional view of a modified form of the molding machine.

As shown, only the two guide rails 1 of the casting machine are represented and also the machine bed 2 which serves as a guide surface for both the slide tables 3 and 4 of the molds. Also, a part 5 of the bed 2 is illustrated in Figure 1, which will be referred to later. The driving motor 6 of the closing device of the molds is directly flanged on to the casting housing 7, which again is screwed to the movable slide table 3 of the molds. The motor shaft is connected within the cast casing 7 through a friction coupling 8 with a toothed wheel 9 mounted in the housing 7. The toothed wheel 9 engages the toothed wheel 10. This toothed wheel 10 is fixed on to the hollow shaft 11 mounted in the axis of the closing device of the molds. A toothed wheel 12 is mounted on this hollow shaft. Moreover a carrier 13 is rotatably mounted on this hollow shaft by the ball bearing (not shown). This carrier carries two stub shafts 14. Rotatably mounted upon the stub shaft 14 are double toothed wheels 15 with two toothed rims 16 and 17 differing in diameter and number of teeth. The toothed rim 16 is engaged on the one hand with the toothed wheel 12 and on the other hand with a toothed rim 18 which is secured in the interior of a pot shaped wheel 19. This wheel is rotatably mounted upon the shaft 11 between the toothed wheels 10 and 12. It possesses besides the teeth 18 bevel teeth 20 which engage with a correspondingly toothed bevel wheel 21. This bevel wheel is attached to the axle 22, which is rotatably mounted in the movable slide table of the mold. Upon the free extremity of the axle 22 is keyed a crank 23 which forms, together with the rod 24, a crank gear. The rod 24 is pivotally connected with the bolt 25 which is fixedly inserted in the engine bed 5.

The teeth 17 of the double toothed wheels 15 are engaged with an internally toothed wheel 26, which latter is rotatably mounted partly in a flange of the movable slide table 3 of the mold and partly on the periphery of the toothed wheel 19. The toothed wheel 26 has a smaller diameter than the toothed rim 18. Accordingly the number of the teeth is also smaller.

The toothed wheel 26 is provided further with external teeth 27, which engage four externally toothed nuts 28 rotatably mounted in the movable slide table 3. The nuts 28 bear against the slide of the molds through the ball bearing 29. The nuts 28 in association with the screw bolts 30 serve to lock the mold. The screw bolts are adjustably fixed in the slide table 4 of the mold, and they are provided each at their front end with a thread 31 which can be brought into engagement with a corresponding internal thread 32 of the nuts 28. The bolts 30 are flattened over the entire length of the thread 31, that is they have their threads interrupted by flat surfaces extending over the whole length of the threads. The internal thread 32 of the nuts 28 has corresponding cut away portions. These cut away portions when the nuts 28 are in appropriate angular position, enable the screw bolts 30 with their threads 31 to be inserted in the nuts, in order to bring about later the engagement of the threads 31 and 32 upon corresponding rotation of the nuts.

The operation of the device is as follows:

If in the case of the open position of the device the motor 6 is switched on, the toothed wheels 9 and 10, the toothed wheel 12 and in consequence also the double toothed wheels 15 are driven through the adjustable friction coupling 8.

When the mold is open the nuts 28 are prevented from rotating by a locking device. For this purpose one of the nuts 32 has a flange 33 with a notch 33', Fig. 5, therein engaged by a locking pawl 34 when the mold is in open position. The locking pawl 34 can be moved out of engagement by a bell crank 35 mounted on a fixed pivot 35a, when a cam surface 36 on an end of the bolt 30, Fig. 3, encounters the arm 37 of the bell crank 35 and rotates the latter in clockwise direction, Fig. 5.

The locking of the nut 28 prevents rotation of the toothed wheel 26. The double toothed wheels 15 then roll upon the toothed wheel 26 and drive simultaneously the wheel 19 and in consequence the bevel wheel 21. By means of the crank gear 23, 24 the slide table of the mold is then moved into the closing position. The half 38 of the mold connected with the slide table 3 of the mold bears against the half 39 of the mold connected with the slide table 4. The slide table 4 is moved against an abutment 40. As a result of this movement the bolts 30 attached to the mold slide 4 penetrate into the mold slide 3, and the one of these four bolts 32 which has the cam surface 36 forces the lower arm 37 of the bell crank 35 upwardly. This causes the bell crank to move the locking pawl 34 out of the notch whereby the previously locked nut 28 can rotate. The wheel 26 may now rotate, whilst the wheel 19 is held fast, as the rotation of the crank gear 23, 24 is limited by abutments. The unlocking of the nuts 28 takes place shortly before the termination of the closing movement approximately when the threads 31, 32 of the screw bolts and of the nuts are distanced at a half pitch of the thread from the final engaging position. The closing movement terminates as soon as both threads may engage each other. From now on a rotation of the nuts may take place. The closing movement may be obtained by spindle- or toothed rack and pinion drive instead of by crank gear.

The locking is effected by rotation of the nuts 28 through which the screw bolts are stressed. With increasing stressing the required torque moment of the motor and thereby rate of charge of the motor increases. If the current surpasses a determined value, the motor is then switched off by a relay. It is also possible to adjust the friction coupling 8 in such a way that with a determined torque moment the coupling of the motor with the toothed wheel 4 is released.

When the injecting and cooling process is terminated, the motor is again switched on but in an opposite sense of rotation. In this connection the pressure generated between the threads and the friction produced thereby is so great that the wheel 26 is held fast. The double toothed wheels 15 then again rotate the wheel 19 and thereby the crank gear 23, 24, that is to say both slide tables of the mold are moved first in the opening direction. Upon a short movement in common, the slide table of the molds 4 abuts against the fixed stop 40. If this stop is taken away the slide table 4 of the mold abuts against a second stop only by travelling a greater distance, in order to remove the mold further from the injecting nozzle before opening. By means of the stop a further rotation of the wheel 19 is prevented. The motor then causes a rotation of the wheel 26 and in consequence a rotation of the nuts 28. For the initial movement of the nuts a sufficient torque moment of the motor 6 is already available at this moment which is still assisted by the momentum of the motor armature of the toothed wheel and other parts.

As soon as the nuts 28 have rotated through an angle of 90°, they are prevented from further rotation by an abutment, that is to say the wheel 26 comes to a standstill. As the locking between both the slide tables of the mold is released, the wheel 19 can continue to rotate and move the half of the mold 3 to the inner position. When this position is reached, the driving motor is switched off by an end contact.

It has been already mentioned that the screw bolts 30 are adjustably fixed in the slide tables 4 of the mold. Nuts 41 serve for this purpose which are screwed upon the ends of the threaded bolts 30. Lock nuts 42 ensure that the adjusted position shall always be maintained. This adjustable fixing enables differences in length of the individual screw bolts to be compensated in order to obtain a uniform tightening of the arrangement by a plurality of locking bolts.

If screw bolts are used as described for locking the halves of the mold, the distance between both halves of the mold 3 and 4 is fixed. In order to allow the balancing of any differences in the thickness of the individual parts of the mold, the half 38 of the mold is fixed upon a wedge-shaped slide table 43, which can be set by a wedge 44 with the aid of a screw 45.

The formation of the shaft 11 as a hollow shaft has the advantage that an ejecting rod 46 may be passed therethrough. Shortly before the open position is reached, this rod abuts against an abutment 47 which is secured to a rim 48 of the housing part 5.

As shown in Figure 4, the motor may be employed simultaneously also for driving an injecting piston 50. This is illustrated diagrammatically in Figure 4 as follows:

The bolts 30a are tubular. Through these tubes extend the bars 51, which in turn are connected with the piston 50 through a bridge 50a with the interposition of a spring buffer, and are rigidly connected at their other ends with a crosshead 52, in the centre of which is mounted the spindle 53.

This spindle serves instead of the crank drive 23, 24 for the movement of the rear slide table 3 of the mold and when the heating of the slide table of the mold is finished drives the piston in the injecting cylinder 54 through the intermediary of the tie rod 51.

Finally, the drive from the motor 6 to the casting body 13a in which the double toothed wheels 15 are mounted in the case of this embodiment takes place directly from the bevel wheel toothing 55. In Fig. 4 the motor 6 is connected to the gearing by means of a bevel pinion keyed to the motor shaft and engaging with the bevel gear wheel 55 so as to drive it directly by the motor, the latter being indicated by the inside dotted line circle to which reference character 6 is applied to indicate the motor.

In order to be able to regulate the velocity of the closing movement of the rear slide table 3 of the mold, and also the speed of the piston, a countershaft 56 is built in within the drive of the spindle 53 to provide at least two speeds.

The motor 6, Fig. 7, which opens and closes the mold is also employed in this construction to drive the spray piston 50. It drives a planetary gear casing 13a through bevel gears 57, 55, in which casing are mounted one or more satellite double pinions in such a manner that the teeth on one side of the double pinion engage a gear wheel on the shaft 59, while the teeth on the other side of the double pinion enclose a gear on the shaft 60. The pitch circle diameters of the gear wheels on the shafts 59 and 60 are slightly different in magnitude so that the casing 13a is driven with a differential action of high reduction ratio, that is when the motor 6 drives the casing 13a and the shaft 59 is held fast, the motor operates the shaft 60 with high reduction, that is at slow speed; on the contrary if the shaft 60 is held fast the motor drives the shaft 59 very slowly. The shaft 59 operates the threaded spindle 53 through gears 56.

In one direction of rotation of the spindle 53 the member 52 is moved to the left, and in the other direction of rotation it is moved to the right. To this traverse member 52 the piston slide 61 is connected by tension rods 51 so that the slide moves to the left upon similar movement of the member 52. The slide 61 transmits the effort of the tension rods to the spray piston 50. The spray piston 50 presses upon the material in the compression cylinder 69. The extension of the compression cylinder towards the mold constitutes a heating cylinder 54 which communicates through the spray nozzle with the mold proper 70, 71.

As long as the nozzle is closed, or the piston encounters no resistance to its forward movement the slide 65 to which the compression cylinder 69 and heating cylinder 54 are attached are moved along with the tension rods 51, slide 61 and piston 50, until the point of the nozzle encounters the mold half 70 to which the mold slide 64 is attached. On further movement of the tension rods 51 in the same direction, the mold half 70 is first moved against the mold half 71. The hollow locking bolts 30a are fixed to the mold slide 64 through which bolts pass the tension rods 51, which hollow bolts 30a, in the closed position of the mold, come into engagement with the locking nuts 28a. The locking pawl 34 engaging the notch 33' of the flange 33, is pressed back as in the first construction according to Figs. 1, 2, 3, 5 and 6, is pressed against action of a spring 73. As long as the locking pawl is in the notch 33', the drive from the motor operates only as far as the piston so that the spraying operation takes place.

On the reverse rotation of the motor the tension rods press against the slide 61 and moves the piston out of the cylinder. The collapsible bolts 68 now permit a small movement of the heating cylinder slide 62 relative to the mold slide 64 which serves the purpose of bringing the nozzle point out of contact with the mold. After the piston has been retracted a certain amount from the heating cylinder, the nuts 66, threaded on the rods 51 and fixed by locking nuts 67, press against the heating cylinder slide.

The common further movement of the three slides 64, 65, 61 can take place only when the rigid locking between the bolts 30a and the other side of the mold is disengaged by left hand rotation of the locking nuts 30a. The three slides 64, 65, 61 actuated by the nuts 66 on the tension rods can be advanced in the direction of the opening of the mold far enough from the fixed member 3 of the mold, by means of the drive motor, to allow the spraying member to fall out of the mold 70, 71.

I claim:

1. An injection molding machine comprising a bed, two slide tables each having a mold part of which one table is mounted for relative movement on the bed towards and away from the other table, a power source, means operable by said power source for traversing said movable slide table along said bed to bring said mold parts into and out of engagement with each other, bolts anchored in one of said slide tables and having screw threads with interrupting flat surfaces, nuts rotatably mounted in the other slide table and having corresponding interrupted threads enabling said bolts to slide in said nuts when the threaded parts of the bolts are aligned with the interruptions of the nut threads, means for locking said nuts against rotation and in sliding relation with said bolts while the power source is actuating the movable slide table to bring the mold parts into engagement, means for releasing said locking means when said mold parts come into engagement, and means for then rotating the nuts from said power source to tighten the mold parts together.

2. A machine according to claim 1, in which a single gear is provided driven by the power source, the nuts have gear teeth and are in mesh thereby with the single gear.

3. An injection molding machine comprising a bed, two slide tables each having a mold part of which one table is mounted for relative movement on the bed towards and away from the other table, a power source, a differential gear driven thereby, means operable by one element of said differential gear for traversing said movable table along said bed to bring said mold parts into and out of engagement with each other, bolts anchored in one of said slide tables and having screw threads with interrupting flat surfaces, nuts rotatably mounted in the other slide table and having corresponding interrupted threads enabling said bolts to slide in said nuts when the threaded parts of the bolts are aligned with the interruptions of the nut threads, means for locking said nuts against rotation and in sliding relation with said bolts while the power source is actuating the movable slide table to bring the mold parts into engagement, means for releasing said locking means when said mold parts come into engagement, and means operable by another element of said differential gear for rotating the nuts to tighten the mold parts together.

4. A machine according to claim 1, in which the mold part on one of the slide tables is adjustable in the direction of mold movement by means of a wedge disposed between said mold part and the slide table.

5. An injection molding machine comprising a bed, two slide tables each having a mold part of which one table is mounted for relative movement on the bed towards and away from the other table, a power source, means operable by said power source for traversing said movable slide table along said bed to bring said mold parts into and out of engagement with each other, bolts anchored in one of said slide tables and having screw threads with interrupting flat surfaces, nuts rotatably mounted in the other slide table and having corresponding interrupted threads enabling said bolts to slide in said nuts when the threaded parts of the bolts are aligned with the interruptions of the nut threads, means for locking said nuts against rotation and in sliding relation with said bolts while the power source is actuating the movable slide table to bring the mold parts into engagement, means on one of said bolts for releasing said locking means when said mold parts come into engagement, and means for then rotating the nuts from said power source to tighten the mold parts together.

6. An injection molding machine comprising a bed, two slide tables each having a mold part of which one table is mounted for relative movement on the bed towards and away from the other table, a power source, a differential gear driven thereby, means operable by one element of said differential gear for traversing said movable slide table along said bed to bring said mold parts into and out of engagement with each other, bolts anchored in one of said slide tables and having screw threads with interrupting flat surfaces, nuts rotatably mounted in the other slide table and having corresponding interrupted threads enabling said bolts to slide in said nuts when the threaded parts of the bolts are aligned with the interruptions of the nut threads, means for locking said nuts against rotation and in sliding relation with said bolts while the power source is actuating the movable slide table to bring the mold parts into engagement, means for releasing said locking means when said mold parts come into engagement, means operable by another element of said differential gear for rotating the nuts to tighten the mold parts together, an injecting piston co-operating with said mold parts, a slide on said bed carrying said injecting piston, and means including rods connecting said piston slide with the power source said rods traversing internal bores of said bolts.

HANS GASTROW.